US012444367B2

(12) United States Patent
Zhang

(10) Patent No.: US 12,444,367 B2
(45) Date of Patent: Oct. 14, 2025

(54) DISPLAY PANEL AND DISPLAY DEVICE WITH DIFFERENT BIAS SIGNAL VOLTAGES

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Mengmeng Zhang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/759,756

(22) Filed: Jun. 28, 2024

(65) Prior Publication Data

US 2024/0355290 A1 Oct. 24, 2024

(30) Foreign Application Priority Data

Jun. 29, 2023 (CN) ......................... 202310794294.9

(51) Int. Cl.
*G09G 3/32* (2016.01)
*G09G 3/3233* (2016.01)

(52) U.S. Cl.
CPC ... *G09G 3/3233* (2013.01); *G09G 2300/0819* (2013.01); *G09G 2310/08* (2013.01); *G09G 2320/0233* (2013.01); *G09G 2340/0435* (2013.01)

(58) Field of Classification Search
CPC ............................................. G09G 3/30–3291
See application file for complete search history.

(56) References Cited

U.S. PATENT DOCUMENTS

2022/0122522 A1* 4/2022 Li ........................ G09G 3/2092
2024/0078972 A1* 3/2024 Zhang .................. G09G 3/3233

FOREIGN PATENT DOCUMENTS

CN 213277408 U 5/2021

* cited by examiner

*Primary Examiner* — Roy P Rabindranath
(74) *Attorney, Agent, or Firm* — KDW Firm PLLC

(57) ABSTRACT

Provided display panel includes: a pixel circuit and a light-emitting element. The pixel circuit includes a dimming module, a drive module providing drive current for the light-emitting element and including a drive transistor, and a bias module connected between bias signal terminal and first terminal of the drive transistor and configured to perform bias adjustment on the drive transistor. A control terminal of the bias module is connected to bias control terminal, and the bias signal terminal is provided with bias signal. The pixel circuit includes working stages including at least a first and a second working stage and a second working stage, a light emission duration of the light-emitting element in the first working stage is different from that in the second working stage, and a bias signal voltage provided by the bias signal terminal in the first working stage is different from that in the second working stage.

20 Claims, 8 Drawing Sheets

DISPLAY PANEL AND DISPLAY DEVICE WITH DIFFERENT BIAS SIGNAL VOLTAGES

CROSS-REFERENCE TO RELATED APPLICATION(S)

This application claims priority to Chinese Patent Application No. 202310794294.9 filed Jun. 29, 2023, the disclosure of which is incorporated herein by reference in its entirety.

TECHNICAL FIELD

The present disclosure relates to the field of display techniques and, in particular, to a display panel and a display device.

BACKGROUND

In a display panel, a pixel circuit is configured to provide a drive current required in display for a light-emitting element of the display panel, controls whether the light-emitting element enters a light emission stage, and is therefore an indispensable element in most self-light emission display panels.

In conventional display panels, in low-frequency displaying, image has an issue of poor display uniformity, which adversely affects display effect.

SUMMARY

The present invention provides a display panel and display device to address the problem of existing poor display panel uniformity.

According to one aspect of the present invention, a display panel is provided, which includes a pixel circuit and a light-emitting element. The pixel circuit includes a dimming module, a drive module and a bias module. The dimming module and the drive module are both connected to the light-emitting element. A control terminal of the dimming module is connected to a dimming control terminal, and the dimming module is configured to adjust a light emission duration of the light-emitting element. The drive module is configured to provide a drive current for the light-emitting element, and the drive module includes a drive transistor. The bias module is connected between a bias signal terminal and a first terminal of the drive transistor, a control terminal of the bias module is connected to the bias control terminal, the bias module is configured to perform bias adjustment on the drive transistor, and the bias signal terminal is configured to provide a bias signal. The pixel circuit includes multiple working stages, the multiple working stages include at least a first working stage and a second working stage. A light emission duration of the light-emitting element in the first working stage and a light emission duration of the light-emitting element in the second working stage are different, and a bias signal voltage provided by the bias signal terminal in the first working stage and a bias signal voltage provided by the bias signal terminal in the second working stage are different.

According to another aspect of the present invention, a display device is provided. The display device includes a display panel. The display panel includes a pixel circuit and a light-emitting element. The pixel circuit includes a dimming module, a drive module and a bias module. The dimming module and the drive module are both connected to the light-emitting element. A control terminal of the dimming module is connected to a dimming control terminal, and the dimming module is configured to adjust a light emission duration of the light-emitting element. The drive module is configured to provide a drive current for the light-emitting element, and the drive module includes a drive transistor. The bias module is connected between a bias signal terminal and a first terminal of the drive transistor, a control terminal of the bias module is connected to the bias control terminal, the bias module is configured to perform bias adjustment on the drive transistor, and the bias signal terminal is configured to provide a bias signal. The pixel circuit includes multiple working stages, the multiple working stages include at least a first working stage and a second working stage. A light emission duration of the light-emitting element in the first working stage and a light emission duration of the light-emitting element in the second working stage are different, and a bias signal voltage provided by the bias signal terminal in the first working stage and a bias signal voltage provided by the bias signal terminal in the second working stage are different.

It is to be appreciated that the contents described herein are not intended to identify key or important features of the embodiments of the present invention, and are not intended to limit the scope of the present invention. Other features of the present invention will become readily understood through the description hereinafter.

BRIEF DESCRIPTION OF DRAWINGS

To illustrate technical solutions in embodiments of the present invention more clearly, drawings used in description of the embodiments are briefly described hereinafter. Apparently, the drawings described hereinafter merely illustrate some embodiments of the present invention, and for the person of ordinary skill in the art, other drawings can be obtained based on these drawings without making creative efforts.

DETAILED DESCRIPTION

For enabling the person skilled in the art to better understand the solutions of the present invention, the technical solutions in embodiments of the present invention are described clearly and completely in conjunction with the drawings in embodiments of the present invention. Apparently, the embodiments described below are part, rather than all, of the embodiments of the present invention. Based on the embodiments in the present invention, all other embodiments obtained by the person skilled in the art on the premise that no creative efforts are made are within the scope of the present invention.

It is to be noted that the terms "first", "second" and the like in the description, claims and the above drawings of the present invention are intended to distinguish between similar objects and are not necessarily used to describe a particular order or sequence. It is to be appreciated that the data used in this way is interchangeable where appropriate so that the embodiments of the present invention described herein may also be implemented in a sequence besides those sequences illustrated or described herein. Furthermore, terms such as "include", "have"; and any deformation thereof, are intended to cover non-exclusive inclusion, e.g., a process, method, system, product, or device including a series of steps or units is not necessarily limited to those steps or units expressly listed, but may include other steps or units not expressly listed or inherent to such process, method, system, product or device.

Figure 1:
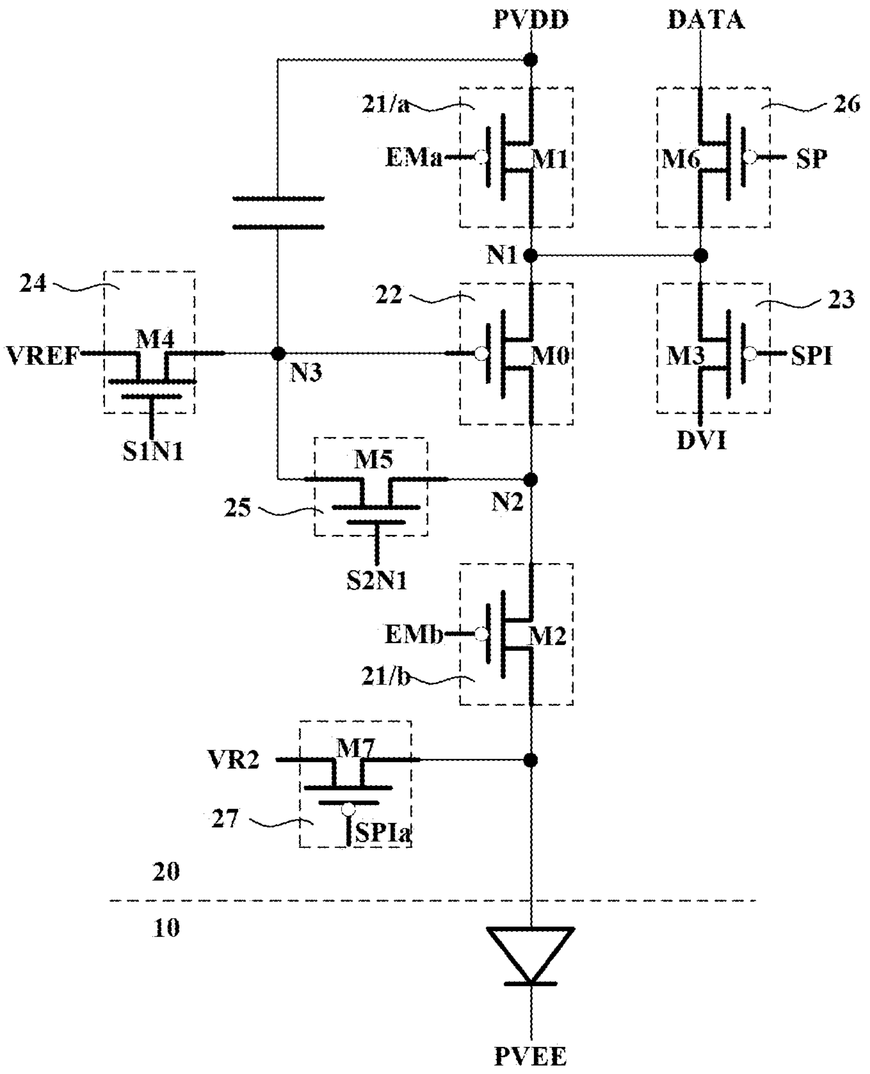
FIG. 1 is a schematic diagram of a pixel circuit of a display panel according to an embodiment of the present invention.
Figure 2:
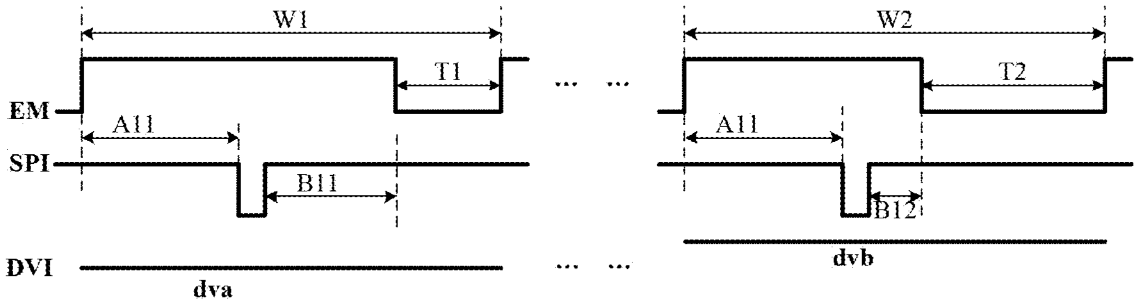
FIG. 2 is a schematic diagram of working stages of a pixel circuit according to an embodiment of the present invention.

FIG. 1 is a schematic diagram of a pixel circuit of a display panel according to an embodiment of the present invention, and FIG. 2 is a schematic diagram of working stages of a pixel circuit according to an embodiment of the present invention. The display panel according to this embodiment includes a light-emitting element 10 and a pixel circuit 20. The pixel circuit 20 includes a dimming module 21, a drive module 22 and a bias module 23. Each of the dimming module 21 and the drive module 22 is connected to the light-emitting element 10. A control terminal of the dimming module 21 is connected to a dimming control terminal EM, and the dimming module 21 is configured to adjust a light emission duration of the light-emitting element 10. The drive module 22 is configured to provide a drive current for the light-emitting element 10, and the drive module 22 includes a drive transistor M0. The bias module 23 is connected between a bias signal terminal DVI and a first terminal N1 of the drive transistor M0, a control terminal of the bias module 23 is connected to the bias control terminal SPI, the bias module 23 is configured to perform bias adjustment on the drive transistor M0, and the bias signal terminal DVI is configured to provide a bias signal. The pixel circuit 20 includes multiple working stages, the multiple working stages include at least a first working stage W1 and a second working stage W2, and a light emission duration of the light-emitting element 10 in the first working stage W1 and a light emission duration of the light-emitting element 10 in the second working stage W2 are different, and bias signal voltages provided by the bias signal terminal DVI in the first working stage W1 and the second working stage W2 are different.

It is to be noted that the key structures in the above-described embodiments are shown by way of example only in FIGS. 1 and 2, and do not include all structures and timing for the pixel circuit to be operated, and all or some of the other circuit structures of the pixel circuit are gradually shown hereinafter in the description of this embodiment.

In this embodiment, the pixel circuit 20 includes a drive module 22, and the drive module 22 includes a control terminal N3, a first terminal N1 and a second terminal N2. In some embodiments, the first terminal N1 of the drive module 22 is connected to an output terminal of the bias module 23, also the first terminal N1 of the drive module 22 is coupled to a first power terminal PVDD. A second terminal N2 of the drive module 22 is coupled to the light-emitting element 10. The drive module 22 includes a drive transistor M0, a gate of the drive transistor M0 is connected to the control terminal N3 of the drive module 22, and a first terminal of the drive transistor M0 is connected to the first terminal N1 of the drive module 22, i.e., the output terminal of the bias module 23. When the control terminal N3 of the drive module 22 receives an effective pulse signal, the drive transistor M0 is turned on, and the drive module 22 is configured to provide a drive current for the light-emitting element 10; and when the control terminal N3 of the drive module 22 receives an ineffective pulse signal, the drive transistor M0 is turned off.

In some embodiments, the drive transistor M0 is a P-type transistor, thus, an input terminal of the drive transistor M0, i.e., a source of the drive transistor M0 is connected to the output terminal of the bias module 23, and an output terminal of the drive transistor M0, i.e., a drain, is coupled to the light-emitting element 10, here N1 may also be represented as a first terminal of the drive transistor M0. It may be understood that the source and the drain of a transistor are not constant but may change as the drive state of the transistor changes. In a case where the drive transistor M0 is a P-type transistor, the effective pulse signal received by the control terminal N3 of the drive module 22 is a low voltage to turn on the drive transistor M0, and the ineffective pulse signal received by the control terminal N3 of the drive module 22 is a high voltage to turn off the drive transistor M0. In other embodiments, the person skilled in the art may reasonably design according to the requirements of the product that the first terminal of the drive module is connected to the output terminal of the bias module, moreover the first terminal of the drive module is coupled to the light-emitting element; and the second terminal of the drive module is coupled to the first power terminal PVDD. Hereinafter, the pixel circuit shown in FIG. 1 is described as an example.

The pixel circuit 20 includes a dimming module 21, the control terminal of the dimming module 21 is connected to the dimming control terminal EM, the dimming module 21 is configured to adjust the light emission duration of the light-emitting element 10, and the drive current provided to the light-emitting element 10 can be controlled by controlling an on/off state of the dimming module 21. When the dimming control terminal EM outputs an effective pulse signal, the dimming module 21 is turned on and drives the light-emitting element 10 to enter a light emission stage, and the drive module 22 is turned on to allow the drive current to flow into the light-emitting element 10. When the dimming control terminal EM outputs an ineffective pulse signal, the dimming module 21 is turned off and the path in which the drive current flows into the light-emitting element 10 is broken.

In some embodiments, the dimming module 21 includes a first dimming unit 21*a* and a second dimming unit 21*b*, the first dimming unit 21*a* includes a first dimming transistor M1, and the second dimming unit 21*b* includes a second dimming transistor M2. A control terminal of the first dimming transistor M1 is connected to a dimming control terminal EMa, and the first dimming transistor M1 is connected between the first power terminal PVDD and the drive module 22. A control terminal of the second dimming transistor M2 is connected to a dimming control terminal EMb, and the second dimming transistor M2 is connected between the drive module 22 and the light-emitting element 10. In some embodiments, the dimming control terminal EMa and the dimming control terminal EMb are connected to the same light emission control signal line, and when the light emission control signal line outputs an effective pulse signal, the first dimming transistor M1 and the second dimming transistor M2 are simultaneously turned on to drive the light-emitting element 10 to enter the light emission stage, and the drive current flows into the light-emitting element 10. When the light emission control signal line outputs the ineffective pulse signal, the first dimming transistor M1 and the second dimming transistor M2 are turned off simultaneously, so that the path in which the drive current flows into the light-emitting element 10 is broken. In other embodiments, the person skilled in the art may reasonably design according to the requirements of the product that the dimming control terminal EMa and the dimming control terminal EMb are connected to different light emission control signal lines, which is not limited thereto. By adjusting the duty cycles of the first dimming transistor M1 and the second dimming transistor M2, the light emission duration of the light-emitting element 10 is changed, so that dimming for the pixel circuit 20 is realized.

The pixel circuit 20 includes the bias module 23. The bias module 23 is connected between the bias signal terminal DVI and the first terminal N1 of the drive transistor M0, and the control terminal of the bias module 23 is connected to the bias control terminal SPI. The bias module 23 is configured to perform bias adjustment on the drive transistor M0, and the bias signal terminal DVI is configured to provide a bias signal. The bias signal terminal DVI is configured to provide a bias signal, and a pulse signal provided by the bias control terminal SPI controls the bias module 23 to be turned on or off. When the biasing control terminal SPI is configured to provide an effective pulse signal, the bias module 23 is turned on, and a bias signal provided by the bias signal terminal DVI is written to the first terminal N1 of the drive transistor M0. When the bias control terminal SPI is configured to provide an ineffective pulse signal, the bias module 23 is turned off, so that the path between the bias signal terminal DVI and the first terminal N1 of the drive transistor M0 is broken. In a case where the bias signal provided by the bias signal terminal DVI is a low voltage, the bias signal provided by the bias signal terminal DVI pulls down the potential of the first terminal N1 of the drive transistor M0 when the bias module 23 is turned on. In a case where the bias signal provided by the bias signal terminal DVI is a high voltage, the bias signal provided by the bias signal terminal DVI pulls up the potential of first terminal N1 of the drive transistor M0 when the bias module 23 is turned on.

When the dimming control terminal EM outputs an effective pulse signal, the dimming module 21 is turned on to drive the light-emitting element 10 to enter the light emission stage, and at this time, the drive transistor M0 is turned on. As shown in FIG. 1, for the drive transistor M0 of the P-type type, the drive transistor M0 is turned on, that is, in a state in which its gate (N3) potential Vg is smaller than source (N1) potential, and at this time, the drive transistor M0 works in an unsaturated state, and its drain (N2) voltage tends to be smaller than gate (N3) voltage, so that the pixel circuit 20 may have a phenomenon in the light emission stage that the P-type transistor is turned on, but the drain voltage is shorter than The gate voltage, and generally, the electric voltage difference between the drain voltage and the gate voltage is also large, and the potential difference is large. Long-term setting as such may result in polarization of ions inside the drive transistor M0, and thus forming a built-in electric field inside the drive transistor M0, resulting in an increasing threshold voltage of the drive transistor M0.

The pixel circuit 20 further includes a reset module 24 and a compensation module 25. A control terminal of the reset module 24 is connected to a reset control terminal S1N1, and the reset module 24 is connected between a reset signal terminal VREF and the control terminal N3 of the drive module 22. A control terminal of the compensation module 25 is connected to a compensation control terminal S2N1, and the compensation module 25 is connected between the control terminal N3 and the second terminal N2 of the drive module 22. In some embodiments, the reset module 24 includes a reset transistor M4 and the compensation module 25 includes a compensation transistor M5. In some embodiments, the reset transistor M4 is NMOS, but is not limited thereto. The reset control terminal S1N1 is configured to provide a high voltage as an effective pulse signal to turn on the reset transistor M4. The reset control terminal S1N1 is configured to provide a low voltage as an ineffective pulse signal to turn off the reset transistor M4. In some embodiments, the compensation transistor M5 is NMOS, but is not limited thereto. The compensation control terminal S2N1 is configured to provide a high voltage as an effective pulse signal to turn on the compensation transistor 25. The compensation control terminal S2N1 is configured to provide a low voltage as an ineffective pulse signal to turn off the compensation transistor M5.

The pixel circuit 20 further includes a data writing module 26. The data writing module 26 is connected between the data signal terminal DATA and the first terminal N1 of the drive transistor M0. A control terminal of the data writing module 26 is connected to a writing control terminal SP, and the data writing module 26 is turned on in a data writing stage. In some embodiments, the data writing module 26 includes a data writing transistor M6, and in some embodiments, the data writing transistor M6 is P-type, but is not limited thereto. The writing control terminal SP is configured to provide a low voltage as an effective pulse signal to turn on the data writing transistor M6. The writing control terminal SP is configured to provide a high voltage as an ineffective pulse signal to turn off the data writing transistor M6.

The pixel circuit 20 further includes an initialization module 27. The initialization module 27 is connected between an initialization signal terminal VR2 and an anode of the light-emitting element 10, and a control terminal of the initialization module 27 is connected to an initialization control terminal SPIa. In some embodiments, the bias control terminal SPI is also served as the initialization control terminal SPIa. In some embodiments, the initialization module 27 includes an initialization transistor M7, and the initialization transistor M7 is P-type, but is not limited thereto. The initialization control terminal SPIa is configured to provide a low voltage as an effective pulse signal to turn on the initialization transistor M7; and the initialization control terminal SPIa is configured to provide a high voltage as an ineffective pulse signal to turn off the initialization transistor M7.

Figure 3:
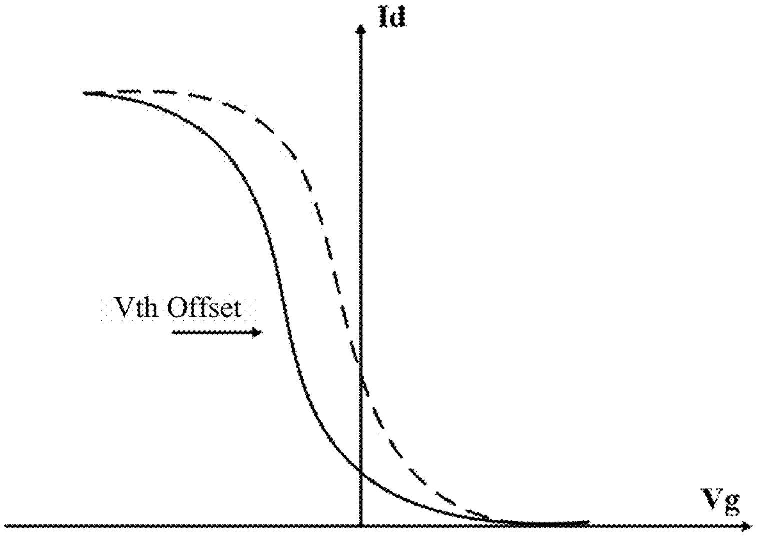
FIG. 3 is a schematic diagram showing an Id-Vg curve offset of a drive transistor.

FIG. 3 is a schematic diagram showing an Id-Vg curve offset of a drive transistor. As shown in FIG. 3, the occurrence of drift of the Id-Vg curve will affect the drive current flowing into the light-emitting element, and thus adversely affecting the display uniformity. In this embodiment, the bias module 23 is added to the pixel circuit 20, and the setting of the bias module 23 can address the hysteresis characteristic of the drive transistor M0. In the non-light emission stage, the bias module 23 is controlled to be turned on to allow the pixel circuit 20 to enter a bias adjustment stage, and in the bias adjustment stage, a bias signal provided by the bias signal terminal DVI can be written into the potentials of the first terminal N1 and the second terminal N2 of the drive transistor M0, to apply the bias signal voltage to the drive transistor M0, to adjust the potential difference between its drain and gate, so as to alleviate the threshold voltage offset phenomenon of the drive transistor M0, and alleviate the hysteresis effect of the drive transistor M0, thereby alleviating the brightness difference between image frames at a lower frequency. In a case where the drive transistor M0 is P-type, in some embodiments, the bias signal provided by the bias signal terminal DVI is a high voltage. In some embodiments, in the bias adjustment stage, the bias module 23 and the drive transistor M0 are both turned on, a high voltage signal provided by the bias signal terminal DVI is written into a drain of the drive transistor M0 via the source of the drive transistor M0 to improve a drain potential of the drive transistor M0, so that a potential difference between a gate potential and the drain potential of the drive transistor M0 can be reduced, and the voltage biasing between the gate and the drain of the drive transistor M0 can be realized, thereby reducing the degree of polarization of internal ions of the drive transistor M0, thereby reducing the degree of threshold voltage offset of the drive transistor M0, and improving the display uniformity.

In this embodiment, the pixel circuit 20 includes multiple working stages. In a case where one refresh image frame of the display panel includes only a data writing frame, one working stage of the pixel circuit 20 is just one refresh image frame, and the first working stage W1 and the second working stage W2 of the pixel circuit 20 are different refresh image frames. In a case where one refresh image frame of the display panel includes multiple refresh image subframes, and the multiple refresh image subframes include one data writing frame and at least one retention frame, one working stage of the pixel circuit 20 is one refresh image subframe, and the first working stage W1 and the second working stage W2 of the pixel circuit 20 may be two refresh image subframes in different refresh image frames, or the first working stage W1 and the second working stage W2 of the pixel circuit 20 may be different refresh image subframes in the same refresh image frame.

A light emission duration of the light-emitting element 10 in the first working stage W1 is different from a light emission duration of the light-emitting element 10 in the second working stage W2. As shown in FIG. 2, the light emission duration of the light-emitting element 10 in the first working stage W1 is T1, the light emission duration of the light-emitting element 10 in the second working stage W2 is T2, and T1 is not equal to T2. As described above, in the light emission stage, the drive transistor M0 is turned on but there is a phenomenon in which its drain voltage is smaller than its gate voltage, in a case where this phenomenon lasts for a long term, it may result in an increasing threshold voltage of the drive transistor M0. Obviously, in a case where the light emission duration of the light-emitting element 10 in the working stage is changed, the threshold voltage offset degree of the drive transistor M0 may also be changed. In this embodiment, T1 is not equal to T2, so the threshold voltage offset degree of the drive transistor M0 in the first working stage W1 is different from the threshold voltage offset degree of the drive transistor M0 in the second working stage W2.

It is to be noted that the display panel changes the non-light emission durations of the light-emitting element 10 in different working stages by EM dimming, thereby changing the light emission durations of the light-emitting element 10 in different working stages. The EM dimming methods of the display panel include EM forward dimming and EM backward dimming. The EM forward dimming is to increase or decrease a time interval between a start instant of the non-light emission stage and a start instant of the bias adjustment stage, that is, to move the position of a rising edge of a signal output by the dimming control terminal EM forward or backward. The EM backward dimming is to increase or decrease a time interval between an end instant of the bias adjustment stage and a start instant of the light emission stage, that is, to move the position of a falling edge of a signal output by the dimming control terminal EM forward or backward. Hereinafter, forward dimming and backward dimming are described respectively. In some embodiments, FIG. 4 is another schematic diagram of working stages of a pixel circuit according to an embodiment of the present invention, FIG. 5 is yet another schematic diagram of working stages of yet a pixel circuit according to an embodiment of the present invention, and FIG. 6 is yet another schematic diagram of working stages of yet a pixel circuit according to an embodiment of the present invention.

Figure 4:
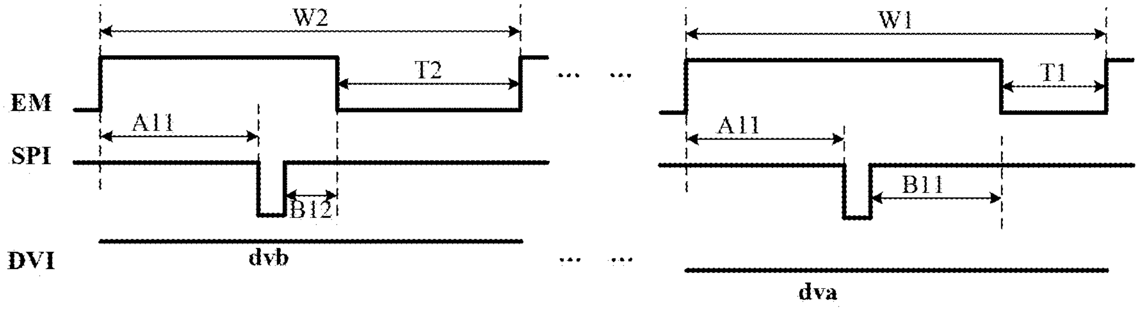
FIG. 4 is another schematic diagram of working stages of a pixel circuit according to an embodiment of the present invention.

Description is made for the backward dimming first, as shown in FIG. 2 and FIG. 4, a stage in which the bias control terminal SPI outputs a low level is the bias adjustment stage. In the first working stage W1, a time interval A between a start instant of the non-light emission stage and a start instant of the bias adjustment stage is A11, and a time interval B between an end instant of the bias adjustment stage and a start instant of the light emission stage is B11. In the second working stage W2, a time interval A between a start instant of the non-light emission stage and a start instant of the bias adjustment stage is A11, and a time interval B between an end instant of the bias adjustment stage and a start instant of the light emission stage is B12. In the example shown in FIG. 2, the first working stage W1 is an earlier stage, the second working stage W2 is a later stage, and a falling edge of a signal output by the dimming control terminal EM moves forward, that is, B11 is larger than B12. In the example shown in FIG. 4, the first working stage W1 is a later stage, the second working stage W2 is an earlier stage, and a falling edge of a signal output by the dimming control terminal EM moves backward, that is, B12 is smaller than B11.

Figure 5:
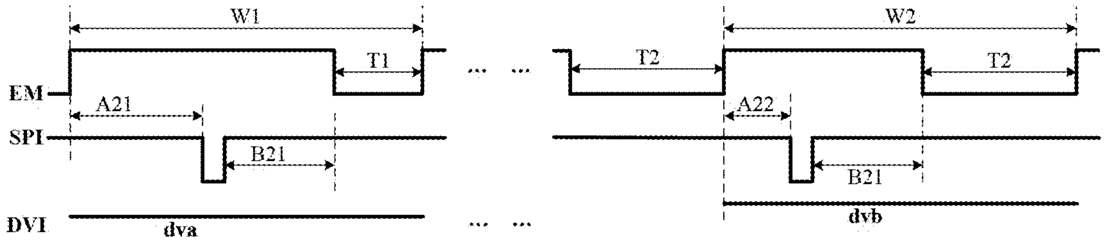
FIG. 5 is yet another schematic diagram of working stages of yet a pixel circuit according to an embodiment of the present invention.
Figure 6:
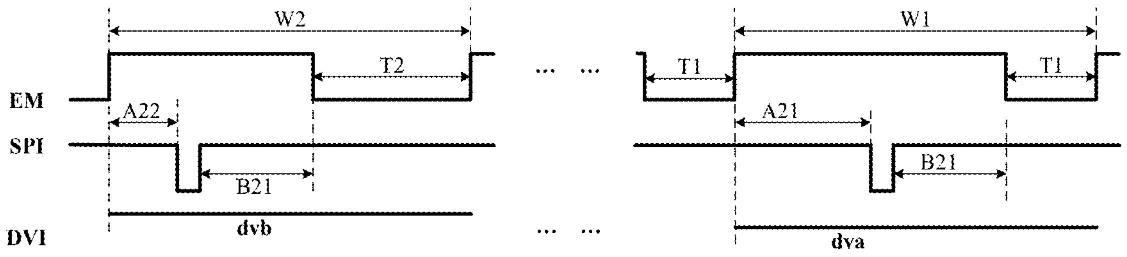
FIG. 6 is yet another schematic diagram of working stages of yet a pixel circuit according to an embodiment of the present invention.

Description is made for the forward dimming next, as shown in FIG. 5 and FIG. 6, in the first working stage W1, a time interval A between a start instant of the non-light emission stage and a start instant of the bias adjustment stage is A21, and a time interval B between an end instant of the bias adjustment stage and a start instant of the light emission stage is B21. In the second working stage W2, a time interval A between a start instant of the non-light emission stage and a start instant of the bias adjustment stage is A22, and a time interval B between an end instant of the bias adjustment stage and a start instant of the light emission stage is B21. In the example shown in FIG. 5, the first working stage W1 is an earlier stage, the second working stage W2 is a later stage, and a raising edge of a signal output by the dimming control terminal EM moves backward, that is, A21 is larger than A22. In the example shown in FIG. 6, the first working stage W1 is a later stage, the second working stage W2 is an earlier stage, and a raising edge of a signal output by the dimming control terminal EM moves forward, that is, A22 is smaller than A21.

In the bias adjustment stage of the non-light emission stage, a bias signal provided by the bias signal terminal DVI regulates potentials of the first terminal N1 and the second terminal N2 of the drive transistor M0, thereby regulating the potential difference between the drain and the gate of the drive transistor M0, and alleviating the threshold voltage offset phenomenon of the drive transistor M0. As described above, different a light emission duration of the light-emitting element 10 in the first working stage W1 and a light emission duration of the light-emitting element 10 in the second working stage W2 may result in different degrees of threshold voltage offset of the drive transistor in the two working stages. Therefore, in an embodiment of the present application, by setting the bias signal voltages provided by the bias signal terminal DVI in the first working stage W1 and the second working stage W2 to be different voltages, it is possible to adjust the bias state of the drive transistor M0 in the first working stage W1 and the second working stage W2 based on the different voltages, respectively, to reduce the difference between the threshold voltage offset degrees of the drive transistor in the two working stages, so that the effects of adjustment performed by the bias module on the bias state of the drive transistor M0 tend to be consistent, thereby enabling the bias states of the drive transistor M0 to tend to be consistent, and thereby facilitating the improvement of the display uniformity.

Furthermore, it is to be noted that the EM backward dimming is to change a bias adjustment duration (B) from an end instant of the bias adjustment stage to a start instant of the light emission stage in the working stage, and the change in the bias adjustment duration (B) has a significant effect on the bias state of the drive transistor. For example, in the example shown in FIG. 2, the hold time B11 of the bias adjustment action after the bias adjustment stage of the first working stage W1 ends is longer than the hold time B12 of the bias adjustment action after the bias adjustment stage of the second working stage W2 ends, and the bias adjustment action of the first working stage W1 is stronger, resulting in a difference between the bias adjustment effects of the two working stages. Therefore, by setting the bias signal voltages provided by the bias signal terminal DVI in the first working stage W1 and the second working stage W2 to be different voltages, it is possible to change the issue of difference between bias adjustment effects of the two working stages caused by the backward dimming, thereby enabling the bias states of the drive transistor M0 to tend to be consistent, and thereby facilitating the improvement of the display uniformity.

In some embodiments, a bias signal voltage provided by the bias signal terminal DVI in the first working stage W1 is dva, a bias signal voltage provided by the bias signal terminal DVI in the second working stage W2 is dvb, and dva is not equal to dvb. It is to be noted that in the laboratory, the display panel is required to reach the same target brightness in different working stages, based on which the magnitudes of the bias signal voltages required by the bias signal terminal DVI in different working stages are measured, the related data is stored in the memory of the display panel, and the related bias signal voltage is directly extracted from the memory in a subsequent bias adjustment, for control. Therefore, the values of dva and dvb are not specifically limited. By adjusting the bias signal voltages in different working stages, the display uniformity of images in different working stages is improved.

In the present invention, the pixel circuit includes a dimming module, a drive module and a bias module. The drive module is configured to provide a drive current for the light-emitting element, the bias module is connected between the bias signal terminal and the first terminal of the drive transistor, the bias module performs a bias adjustment for the drive transistor, and the bias signal terminal is configured to provide a bias signal. A light emission duration of the light-emitting element in the first working stage and a light emission duration of the light-emitting element in the second working stage are different, thus the threshold voltage offset degrees of the drive transistor in the first working stage and the second working stage are different. In the non-light emission stage, by setting the a bias signal voltage provided by the bias signal terminal in the first working stage and a bias signal voltage provided by the bias signal terminal in the second working stage to be different, bias adjustments can be performed for the threshold voltage offset phenomena of the drive transistor in the first working stage and the second working stage, respectively, thereby alleviating the difference between the threshold voltage offset degrees of the drive transistor in the first working stage and the second working stage, enabling the bias states of the drive transistor in the working stages with different light emission durations to tend to be consistent, and thereby facilitating the improvement of the display uniformity.

Figure 7:
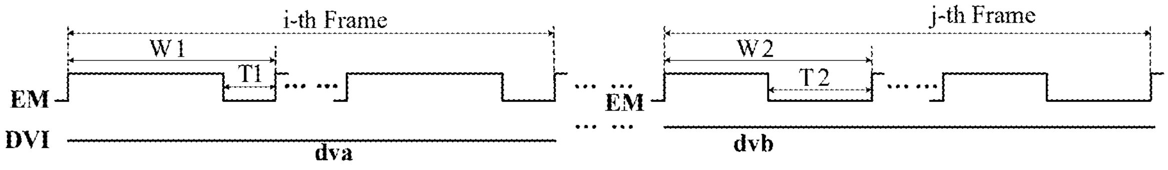
FIG. 7 is yet another schematic diagram of working stages of yet a pixel circuit according to an embodiment of the present invention.

FIG. 7 is yet another schematic diagram of working stages of yet a pixel circuit according to an embodiment of the present invention. As shown in FIG. 7, in some embodiments, the display panel includes S refresh image frames, one of the S refresh image frames includes M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, where $S>1$, $M>1$; and the first working stage W1 is an x-th refresh image subframe of an i-th refresh image frame, and the second working stage W2 is an x-th refresh image subframe of a j-th refresh image frame, where $i\neq j$, and $M\geq x\geq 1$.

In this embodiment, one of the S refresh image frames includes at least two refresh image subframes, in turn, the first refresh image subframe to the M-th refresh image subframes. In some embodiments, the first refresh image subframe in one of the S refresh image frames is a data writing frame, the data writing frame includes a data writing stage, and in the data writing frame, new display data is written into the pixel circuit. The second refresh image subframe to the M-th refresh image subframe in one of the S refresh image frames are all retention frames. In the retention frames, no new display data is written into the pixel circuit, and the display data of a previous refresh image subframe is still retained. FIG. 7 shows an i-th refresh image frame and the data writing frame (i.e., a first refresh image subframe of the M refresh image subframes) and the last retention frame (i.e., the M-th refresh image subframe) therein, and multiple refresh image subframes between the first refresh image subframe and the M-th refresh image subframe being denoted by ellipsis; a j-th refresh image frame and the data writing frame (i.e., the first refresh image subframe) and the last retention frame (i.e., the M-th refresh image subframe) therein, and multiple refresh image subframes between the first refresh image subframe and the M-th refresh image subframe being denoted by ellipsis. A bias adjustment stage is set in a non-light emission stage of the first refresh image subframe, and in the bias adjustment stage, the bias module 23 and the drive module 22 are all turned on, a bias signal from the bias signal terminal DVI is written from the source (N1) of the drive transistor M0 to the drain (N2) of the drive transistor M0, thereby, the voltage between the gate and the drain of the bias drive transistor M0 can be biased to alleviate the bias phenomenon of the pixel circuit 20.

In some embodiments, x=1, the first working stage W1 is the first refresh image subframe, i.e., the data writing frame, of the i-th refresh image frame, and the second working stage W2 is the first refresh image subframe, i.e., the data writing frame, of the j-th refresh image frame. A light emission duration of the light-emitting element in the data writing frame of the i-th refresh image frame is T1, a light emission duration of the light-emitting element in the data writing frame of the j-th refresh image frame is T2, and T1 is different from T2. In a non-light emission stage of the data writing frame of the i-th refresh image frame, the bias signal terminal DVI is configured to provide the bias signal voltage dva; and in a non-light emission stage of the data writing frame of the j-th refresh image frame, the bias signal terminal DVI is configured to provide the bias signal voltage dvb, and dva is different from dvb. The dva and dvb are adjusted properly, thereby may alleviate the difference between the threshold voltage offset degrees of the drive transistor in the first working stage W1 and the second working stage W2, and enable the bias states of the drive transistor in various working stages with different light emission durations to tend to be consistent, and thereby facilitating the improvement of the display uniformity. The bias signal voltages of the same refresh image subframe in different refresh image frames are adjusted, thereby improving the display uniformity of different refresh image frames.

Figure 8:
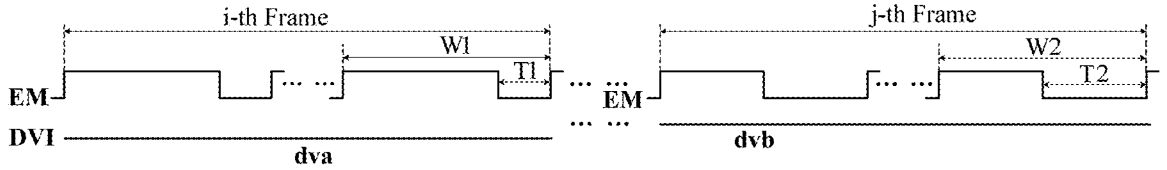
FIG. 8 is yet another schematic diagram of working stages of yet a pixel circuit according to an embodiment of the present invention.

In other embodiments, further in some embodiments, the first working stage and the second working stage are retention frames of different refresh image frames. In some embodiments, FIG. 8 is yet another schematic diagram of working stages of yet a pixel circuit according to an embodiment of the present invention. As shown in FIG. 8, in some embodiments, x is not equal to 1, the first working stage W1 is the M-th refresh image subframe, i.e., the last retention frame, of the i-th refresh image frame, and the second working stage W2 is the M-th refresh image subframe, i.e., the last retention frame, of the j-th refresh image frame. However, it is not limited thereto, the first working stage and the second working stage may further be the second refresh image subframe or other refresh image subframe of different refresh image frames.

Referring to FIG. 2, FIG. 4, FIG. 5, and FIG. 6, in some embodiments, the light emission duration T1 of the light-emitting element in the first working stage W1 is shorter than the light emission duration T2 of the light-emitting element in the second working stage W2, and the bias signal voltage dva corresponding to the first working stage W1 is lower than the bias signal voltage dvb corresponding to the second working stage W2.

In this embodiment, in a case where the light emission duration T1 of the light-emitting element in the first working stage W1 is shorter than the light emission duration T2 of the light-emitting element in the second working stage W2, the threshold voltage offset degree of the drive transistor in the first working stage W1 is lower than the threshold voltage offset degree of the drive transistor in the second working stage W2. Based on this, the bias signal terminal DVI may use a small bias signal voltage dva in the first working stage W1 to adjust the bias state of the drive transistor, and reduce the threshold voltage offset degree of the drive transistor. The bias signal terminal DVI may use a large bias signal voltage dvb in the second working stage W2 to adjust the bias state of the drive transistor, and reduce the threshold voltage offset degree of the drive transistor. In this embodiment of the present application, the bias signal voltage dva corresponding to the first working stage W1 is set to be lower than the bias signal voltage dvb corresponding to the second working stage W2, thereby enabling the bias states of the drive transistor in the first working stage W1 and the second working stage W2 to tend to be consistent, and improving the display uniformity.

Reference is made to FIG. 2, for two working stages W1 and W2, in some embodiments, T1 is shorter than T2 and B11 is larger than B12. In order to verify the above condition, the inventors took B12 being of 10H and B11 being of 70H (where H is the row frequency) as an example. The test results show that when the bias adjustment effects of the first working stage W1 and the second working stage W2 tend to be consistent, the optimal bias signal voltage dva of the first working stage W1 is lower than the optimal bias signal voltage dvb of the second working stage W2.

Illustratively, the parameters of the display panel are designed such that the refresh rate is equal to 10 Hz and the brightness value is equal to 3 nit. The test yielded the following results.

For the case where B12 is 10H, the test results of the bias signal voltage OBS and the flicker value FLK are:

1) OBS=2V, FLK=−31.3;
2) OBS=3V, FLK=−35.81;
3) OBS=3.5V, FLK=−44.5;
4) OBS=3.6V, FLK=−48.89;
5) OBS=4V, FLK=−48.76; and
6) OBS=5V, FLK=−36.31.

As described above, when the display panel works in the second working stage W2, the flicker corresponding to FLK=−48.89 is weakest, and the OBS corresponding to FLK=−48.89, that is, 3.6V, is the optimal bias signal voltage of the second working stage W2.

In the case where B11 is 70H, the test results of the bias signal voltage OBS and the flicker value FLK are:

1) OBS=1V, FLK=−33.16;
2) OBS=2V, FLK=−34.28;
3) OBS=3V, FLK=−44.48;
4) OBS=4V, FLK=−31.02; and
5) OBS=5V, FLK=−27.99.

As described above, when the display panel works in the first working stage W1, the flicker corresponding to FLK=−44.48 is weakest, thus, the OBS corresponding to FLK=−44.48, that is, 3V, is the optimal bias signal voltage of the first working stage W1.

It can be verified that when the bias adjustment durations B of the two working stages are different, reducing the bias signal voltage of the working stage with a large bias adjustment duration can reduce the difference between the bias adjustment effects of the two working stages and improve the display effect. It is be noted that the inventors also carried out a corresponding test for the case of forward dimming and obtained the same result, which is not described in detail herein.

Figure 9:
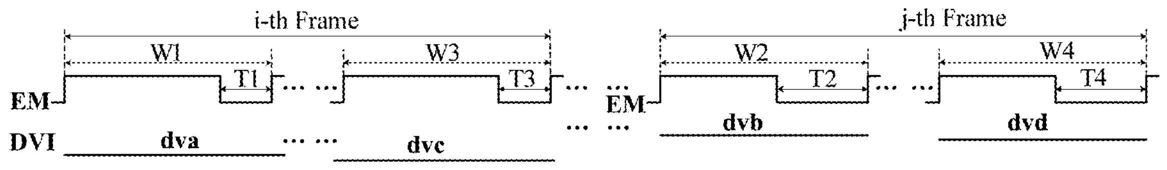
FIG. 9 is yet another schematic diagram of working stages of yet a pixel circuit according to an embodiment of the present invention.

FIG. 9 is yet another schematic diagram of working stages of yet a pixel circuit according to an embodiment of the present invention. As shown in FIG. 9, in some embodiments, the display panel includes S refresh image frames. One of the S refresh image frames includes M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1. The first working stage W1 is a data writing frame of an i-th refresh image frame, and the second working stage W2 is a data writing frame of a j-th refresh image frame, where i≠j. The multiple working stages further include a third working stage W3 and a fourth working stage W4, the third working stage W3 is a p-th refresh image subframe of the i-th refresh image frame, and the fourth working stage W4 is a p-th refresh image subframe of the j-th refresh image frame, where 2≤p≤M. A light emission duration T3 of the light-emitting element in the third working stage W3 is different from a light emission duration T4 of the light-emitting element in the fourth working stage W4, and a bias signal voltage dvc corresponding to the third working stage W3 is different from a bias signal voltage dvd corresponding to the fourth working stage W4. In FIG. 9, in some embodiments, p=M, and in other embodiments, further in some embodiments, the p-th refresh image subframe is any one retention frame of the second frame to the (M−1)-th frame, and is not limited thereto. The bias signal voltages of the same refresh image subframe in different refresh image frames are adjusted, thereby improving display uniformity of the different refresh image frames.

In this embodiment, the data writing frame of the i-th refresh image frame is the first working stage W1, the light emission duration of the light-emitting element in the first working stage W1 is T1, the M-th retention frame of the i-th refresh image frame is the third working stage W3, and the light emission duration of the light-emitting element in the third working stage W3 is T3. The data writing frame of the j-th refresh image frame is the second working stage W2, the light emission duration of the light-emitting element in the second working stage W2 is T2, the M-th retention frame of the j-th refresh image frame is the fourth working stage W4, and the light emission duration of the light-emitting element in the fourth working stage W4 is T4. However, it is not limited thereto.

In an embodiment of the present application, the light emission duration T1 of the light-emitting element in the first working stage W1 is different from the light emission duration T2 of the light-emitting element in the second working stage W2, and the light emission duration T3 of the light-emitting element in the third working stage W3 is different from the light emission duration T4 of the light-emitting element in the fourth working stage W4, that is, when the light emission duration of the light-emitting element in the data writing frame changes, the light emission durations of the light-emitting element in the retention frames follow the change to maintain the display uniformity of the data writing frame and the retention frames after the dimming. Therefore, when the bias signal voltage of the data writing frame changes, that is, when the bias signal voltage dva of the bias signal terminal DVI in the first working stage W1 changes to the bias signal voltage dvb of the bias signal terminal DVI in the second working stage W2, the bias signal voltages corresponding to the retention frames are also required to be adjusted, that is, the bias signal voltage dvc of the bias signal terminal DVI in the third working stage W3 is set to be different from the bias signal voltage dvd of the bias signal terminal DVI in the fourth working stage W4, thereby realizing that in the different refresh images, the bias states of the drive transistor in the data writing frames tend to be consistent, and the bias states of the drive transistor in the retention frames also tend to be consistent, so that the display uniformity can be improved.

In some embodiments, the light emission duration T1 of the light-emitting element in the first working stage W1 is shorter than the light emission duration T2 of the light-emitting element in the second working stage W2, and the bias signal voltage dva corresponding to the first working stage W1 is lower than the bias signal voltage dvb corresponding to the second working stage W2. Moreover, the light emission duration T3 of the light-emitting element in the third working stage W3 is shorter than the light emission duration T4 of the light-emitting element in the fourth working stage W4, and the bias signal voltage dvc corresponding to the third working stage W3 is lower than the bias signal voltage dvd corresponding to the fourth working stage W4. In an embodiment of the present application, the bias signal voltage dva corresponding to the first working stage W1 may be the same as or different from the bias signal voltage dvc corresponding to the third working stage W3; and the bias signal voltage dvb corresponding to the second working stage W2 may be the same as or different from the bias signal voltage dvd corresponding to the fourth working stage W4, which is not limited herein.

In this embodiment, the first working stage W1 is a data writing frame of the i-th refresh image frame, the second working stage W2 is a data writing frame of the j-th refresh image frame, the light emission duration T1 of the light-emitting element in the first working stage W1 is shorter than the light emission duration T2 of the light-emitting element in the second working stage W2, and the bias signal voltage dva corresponding to the first working stage W1 is lower than the bias signal voltage dvb corresponding to the second working stage W2, so that the bias adjustment effects of the first working stage W1 and the second working stage W2 are close to each other or tend to be consistent.

Figure 10:
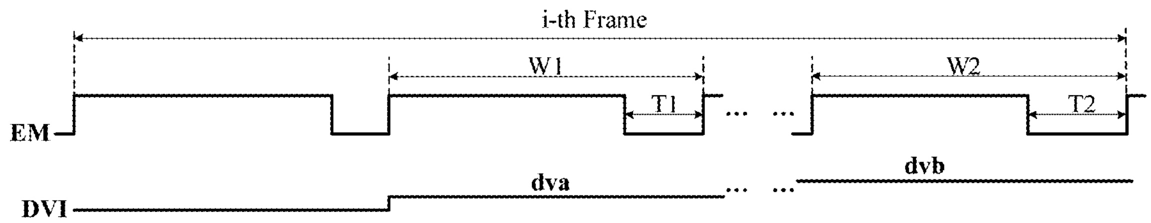
FIG. 10 is yet another schematic diagram of working stages of yet a pixel circuit according to an embodiment of the present invention.

FIG. 10 is yet another schematic diagram of working stages of yet a pixel circuit according to an embodiment of the present invention. As shown in FIG. 10, in some embodiments, the display panel includes S refresh image frames. One of the S refresh image frames includes M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1. The first working stage is an x-th refresh image subframe of an i-th refresh image frame, and the second working stage is a y-th refresh image subframe of the i-th refresh image frame, where $M \geq x \geq 1$, $M \geq y \geq 1$, and $x \neq y$. The bias signal voltages of different refresh image subframes in the same refresh image frame are adjusted, thereby improving the display uniformity of the different refresh image subframes.

In this embodiment, the first working stage W1 and the second working stage W2 may be two frames of retention frames of the i-th refresh image frame. In some embodiments, the first working stage W1 may be a second refresh image subframe of the i-th refresh image frame and the second working stage W2 may be an M-th refresh image subframe of the i-th refresh image frame; which is not limited thereto. In other embodiments, the first working stage may be a data writing frame of the i-th refresh image frame and the second working stage may be a retention frame of the i-th refresh image frame.

In some embodiments, x is smaller than y. In one of the S refresh image frames, display data is written in the data writing frame, and is not written in the retention frames, and the gate of the drive transistor has a current leakage phenomenon. The longer the time, the larger the current leakage amount, and therefore, the brightness of the refresh image subframes in one of the S refresh image frames becomes lower and lower at a lower frequency. Therefore, in one of the S refresh image frames, it is possible to design that the light emission duration T2 of the y-th refresh image subframe is larger than the light emission duration T1 of the x-th refresh image subframe, and the brightness of the y-th refresh image subframe can be compensated by extending the light emission duration of the y-th refresh image subframe, thereby, the brightness difference between the y-th refresh image subframe and the x-th refresh image subframe can be reduced. Similarly, in one of the S refresh image frames, the brightness can be compensated by extending the light emission durations of the retention frames, thereby addressing the issue that the brightnesses of the retention frames are lower than the brightness of the data writing frame.

In addition, in one of the S refresh image frames, it is possible to design that the bias signal voltage dvb of the bias signal terminal DVI in the second working stage W2 is larger than the bias signal voltage dva of the bias signal terminal DVI in the first working stage W1, thereby enabling the bias adjustment effects of the working stages in one of the S refresh image frames to tend to be close to each other or to be consistent. In some embodiments, in one of the S refresh image frames, in a case where the bias signal voltage of the data writing frame is adjusted and the bias signal voltages of the retention frames are not adjusted, the bias adjustment effects of the data writing frame and the retention frames in the one of the S refresh image frames differ significantly; while, in one of the S refresh image frames, in a case where the bias signal voltage of the data writing frame is adjusted and the bias signal voltages of the retention frames change accordingly, the bias adjustment effects of the data writing frame and the retention frames in the one of the S refresh image frames are enabled to tend to be consistent. Similarly, in one of the S refresh image frames, the bias signal voltage of the earlier retention frame is adjusted, and the bias signal voltages of the later retention frames change following the change of the bias signal voltage of the earlier retention frame, the bias adjustment effects of the multiple retention frames in the one of the S refresh image frames are enabled to tend to be consistent.

As described above, in the one of the S refresh image frames, the light emission duration of the earlier x-th refresh image subframe is set to be shorter than the light emission duration of the later y-th refresh image subframe, thereby, the issue of brightness difference between different refresh image subframes caused by current leakage of the drive transistor can be addressed. Moreover, the bias signal voltage of the x-th refresh image subframe is set to be lower than the bias signal voltage of the y-th refresh image subframe, thereby, the issue of different of bias adjustment effects of different refresh image subframes can be addressed, and the display uniformity of the one of the S refresh image frames can be improved. In a case wherein one of the S refresh image frames, the light emission duration of the earlier x-th refresh image subframe is equal to the light emission duration of the later y-th refresh image subframe, by setting the bias signal voltage of the x-th refresh image subframe to be lower than the bias signal voltage of the y-th refresh image subframe, the brightness of the later refresh image subframe can be compensated and the display uniformity of the one of the S refresh image frames can be improved.

Figure 11:
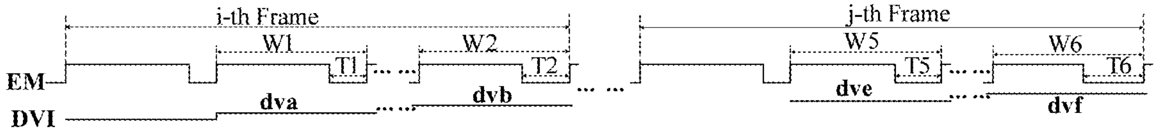
FIG. 11 is yet another schematic diagram of working stages of yet a pixel circuit according to an embodiment of the present invention.

FIG. 11 is a schematic diagram of yet another pixel circuit working stage according to an embodiment of the present invention. As shown in FIG. 11, in some embodiments, the multiple working stages further include a fifth working stage W5 and a sixth working stage W6, the fifth working stage W5 is an x-th refresh image subframe of a j-th refresh image frame, and the sixth working stage W6 is a y-th refresh image subframe of the j-th refresh image frame. A light emission duration T5 of the light-emitting element in the fifth working stage W5 is different from the light emission duration T1 of the light-emitting element in the first working stage W1, and a light emission duration of the light-emitting element in the sixth working stage W6 is different from the light emission duration T2 of the light-emitting element in the second working stage W2; and $\Delta Ti_{15} \neq \Delta Ti_{26}$, $\Delta V_{15} \neq \Delta V_{26}$. In some embodiments, $\Delta Ti_{15}$ is the difference between the light emission duration of the light-emitting element in the first working stage W1 and the light emission duration of the light-emitting element in the fifth working stage W5, $\Delta Ti_{26}$ is the difference between the light emission duration of the light-emitting element in the second working stage W2 and the light emission duration of the light-emitting element in the sixth working stage W6, $\Delta V_{15}$ is the difference between the bias signal voltage dva corresponding to the first working stage W1 and a bias signal voltage dve corresponding to the fifth working stage W5, and $\Delta V_{26}$ is the difference between the bias signal voltage dvb corresponding to the second working stage W2 and a bias signal voltage dvf corresponding to the sixth working stage W6.

In this embodiment, in some embodiments, x=2 and y=M, the second refresh image subframe of the j-th refresh image frame is the fifth working stage W5, and the M-th refresh image subframe of the j-th refresh image frame is the sixth working stage W6.

The light emission duration T5 of the light-emitting element in the fifth working stage W5 is different from the light emission duration T1 of the light-emitting element in the first working stage W1, thus, the bias signal voltage dve corresponding to the fifth working stage W5 is different from the bias signal voltage dva corresponding to the first working stage W1. In some embodiments, T1 is shorter than T5, thus, dva is designed to be smaller than dve, which can improve the bias adjustment effects in the first working stage W1 and the fifth working stage W5.

The light emission duration T6 of the light-emitting element in the sixth working stage W6 is different from the light emission duration T2 of the light-emitting element in the second working stage W2, thus, the bias signal voltage dvf corresponding to the sixth working stage W6 is different from the bias signal voltage dvb corresponding to the second working stage W2. In some embodiments, T2 is shorter than T6, thus, dvb is designed to be smaller than dvf, which can improve the bias adjustment effects in the second working stage W2 and the sixth working stage W6.

In one of the S refresh image frames, the light emission duration of the x-th refresh image subframe is shorter than the light emission duration of the y-th refresh image subframe, so the bias signal voltage corresponding to the x-th refresh image subframe is set to be different from the bias signal voltage corresponding to the y-th refresh image subframe. In some embodiments, T1 is shorter than T2, thus dva is smaller than dvb; and T5 is shorter than T6, thus dve is smaller than dvf.

$\Delta Ti_{15}$ is a duration difference between T1 and T5, $\Delta Ti_{26}$ is a duration difference between T2 and T6, $\Delta V_{15}$ is a voltage difference between dva and dve, and $\Delta V_{26}$ is a voltage difference between dvb and dvf. The increment $\Delta Ti_{15}$ from the light emission duration of the x-th refresh image subframe in the i-th refresh image frame to the light emission duration of the x-th refresh image subframe in the j-th refresh image frame is different from the increment $\Delta Ti_{26}$ from the light emission duration of the y-th refresh image subframe in the i-th refresh image frame to the light emission duration of the y-th refresh image subframe in the j-th refresh image frame, the increment $\Delta V_{15}$ from the bias signal voltage of the x-th refresh image subframe in the i-th refresh image frame to the bias signal voltage of the x-th refresh image subframe in the j-th refresh image frame is different from the increment $\Delta V_{26}$ from the bias signal voltage of the y-th refresh image subframe in the i-th refresh image frame to the bias signal voltage of the y-th refresh image subframe in the j-th refresh image frame. The bias signal voltages of the same refresh image subframes of different refresh image frames are adjusted, thereby improving the display uniformity of different refresh image frames.

In some embodiments, one of the S refresh image frames at a lower frequency has multiple refresh image subframes, those refresh image subframes includes one data writing frame and multiple retention frames. Since the gate of the drive transistor has current leakage, the brightness of the refresh image subframes in one of the S refresh image frames is gradually decreased, and it is possible to set the light emission duration of a later refresh image subframe in the one of the S refresh image frames to be larger than the light emission duration of an earlier refresh image subframe, thereby compensating the brightness difference of the refresh image subframes in the one of the S refresh image frames and improving the display uniformity.

For one of the S refresh image frames, the increment of adjusted light emission duration of the retention frame should be different from the increment of adjusted light emission duration of the data writing frame, thus it can ensure that the brightness is the same. For example, in the first refresh image frame of the low frequency LTPS display panel, the light emission duration of the data writing frame is 8H, the light emission duration of the first retention frame is 12H, and the light emission duration of the second retention frame is 16H. The second refresh image frame is a frame after being dimmed. Assuming that the light emission duration of the data writing frame in the second refresh image frame becomes 12H, in this case, the increment of the light emission duration of the first retention frame should exceed the increment, 4H, of the data writing frame, so as to try to maintain the consistency of the brightness of the images, for example, the light emission duration of the first retention frame in the second refresh image frame becomes 18H. On this basis, for the second retention frame in the second refresh image frame, the light emission duration of the second retention frame increases to be more than the light emission duration of the first retention frame by 6H, for example, the light emission duration of the second retention frame becomes 24H or the like, which is not specifically limited herein.

When the light emission durations of different refresh image subframes in one of the S refresh image frames are different, the bias signal voltages of different refresh image subframes are also required to be adjusted to be inconsistent, thereby ensuring that each refresh image subframe has an optimal bias adjustment effect.

It is to be noted that, in two different refresh image frames, the increment between the light emission durations of the corresponding retention frames is different from the increment between the light emission durations of the corresponding data writing frames, and thus, the change amount/rate between the bias signal voltages of the corresponding retention frames should also be different from the variation amount/rate between the bias signal voltages the corresponding data writing frames, thereby ensuring that the display panel has an optimal bias adjustment effect.

For example, in the first refresh image frame of the low frequency LTPS display panel, the light emission duration of the data writing frame is 8H, the light emission duration of the first retention frame is 12H, and the light emission duration of the second retention frame is 16H. The second refresh image frame is a frame after being dimmed, the light emission duration of the data writing frame in the second refresh image frame becomes 12H, the light emission duration of the first retention frame is 18H, and the light emission duration of the second retention frame is 24H. The difference between the bias signal voltage of the x-th refresh image subframe in the first refresh image frame and the bias signal voltage of the x-th refresh image subframe in the second refresh image frame is different from the difference between the bias signal voltage of the y-th refresh image subframe in the first refresh image frame and the bias signal voltage of the y-th refresh image subframe in the second refresh image frame, thus the optimal bias adjustment effect can be ensured, and x is smaller than y.

As described above, in one of the S refresh image frames, the light emission duration of the data writing frame and the light emission duration of the retention frame are different. In order to make the brightness of the data writing frame and the brightness of the retention frame equal after the dimming, the light emission duration increment of the retention frame can be made larger than that of the data writing frame. On this basis, in one of the S refresh image frames, the bias signal voltage variation amount of the data writing frame is adjusted to be different from the bias signal voltage variation amount of the retention frame, so that the optimal bias adjustment effect can be ensured.

In some embodiments, the display panel includes N light emission duration intervals which are different from each other and N bias signal voltages which are different from each other, and a k-th light emission duration interval corresponds to a k-th bias signal voltage, $N \geq k \geq 1$, $N>1$. A light emission duration of the light-emitting element in one of the multiple working stages is within the k-th light emission duration interval, and a bias signal provided by the bias signal terminal in this one working stage is the k-th bias signal voltage. In some embodiments, a light emission duration value of the k-th light emission duration interval is smaller than a light emission duration value of a (k+1)-th light emission duration interval, and the k-th bias signal voltage is lower than or equal to a (k+1)-th bias signal voltage.

In this embodiment, in a laboratory stage before leaving the factory, a target brightness of the display panel is preset, and a light emission duration of the working stage of the pixel circuit is set to Z1, thus, a bias signal voltage is applied to the pixel circuit to allow the pixel circuit to display at the preset target brightness, and the bias signal voltage value DVA is determined as the bias signal voltage corresponding to the light emission duration Z1. The light emission duration of the working stage of the pixel circuit is continued to be adjusted to Z2, a bias signal voltage is applied to the pixel circuit to allow the pixel circuit to display at the preset target brightness, the bias signal voltage value DVB is determined as the bias signal voltage corresponding to the light emission duration Z2. By analogy, multiple different bias signal voltages can be obtained, and each bias signal voltage corresponds to one light emission duration interval.

The light emission duration value of the first light emission duration interval is shorter than the light emission duration value of the second light emission duration interval, and accordingly, the first bias signal voltage corresponding to the first light emission duration interval is smaller than or equal to the second bias signal voltage corresponding to the second light emission duration interval. By analogy, the light emission duration value of the k-th light emission duration interval is shorter than the light emission duration value of the (k+1)-th light emission duration interval, and the k-th bias signal voltage is smaller than or equal to the (k+1)-th bias signal voltage.

Figure 12:
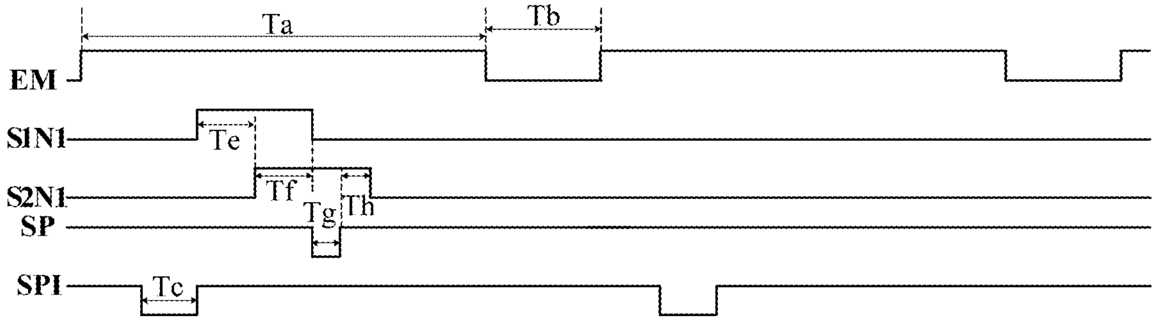
FIG. 12 is a schematic timing diagram of the pixel circuit shown in FIG. 1.
Figure 13:
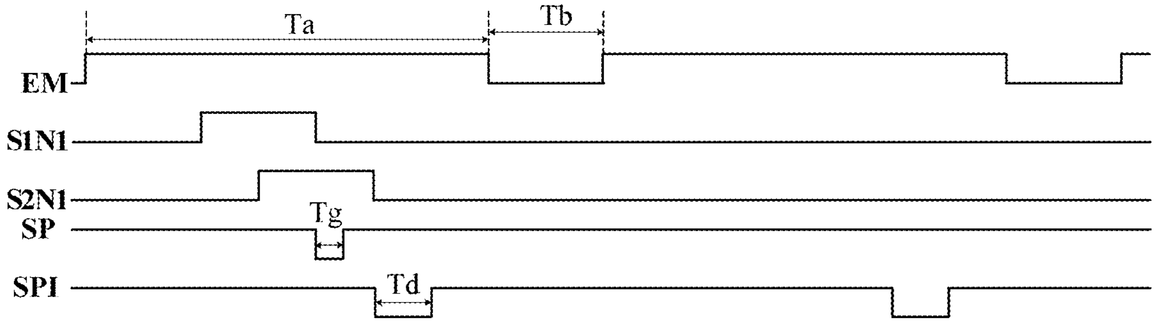
FIG. 13 is another schematic timing diagram of the pixel circuit shown in FIG. 1.
Figure 14:
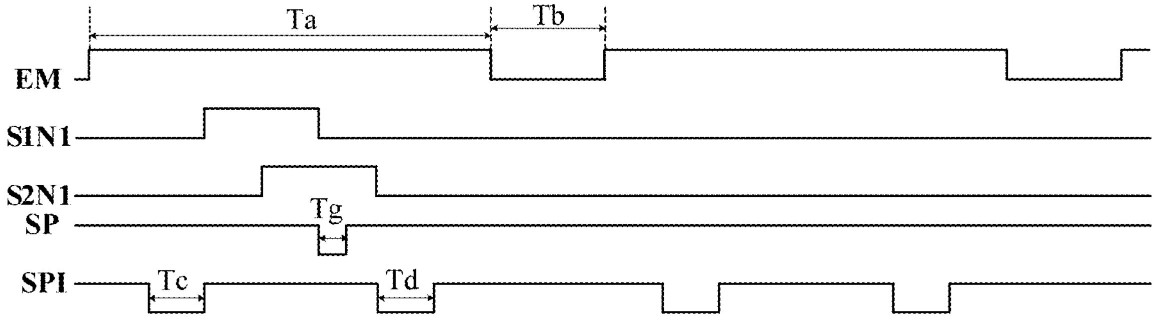
FIG. 14 is yet another schematic timing diagram of the pixel circuit shown in FIG. 1.

FIG. 12 is a schematic timing diagram of the pixel circuit shown in FIG. 1, FIG. 13 is another schematic timing diagram of the pixel circuit shown in FIG. 1, and FIG. 14 is yet another schematic timing diagram of the pixel circuit shown in FIG. 1. In some embodiments, the working stages of the pixel circuit 20 include a pre-stage Ta and a light emission stage Tb which are sequentially performed, and the dimming module 21 is turned off in the pre-stage Ta and turned on in the light emission stage Tb. The pre-stage Ta includes a bias stage, the bias module 23 is turned on in the bias stage, and the bias stage includes a first bias sub-stage Tc and/or a second bias sub-stage Td. It is to be noted that the first working stage of the pixel circuit 20 includes the sequentially performed pre-stage and light emission stage, and the duration of the light emission stage is just the light emission duration of the light-emitting element in the first working stage. The second working stage of the pixel circuit 20 includes the sequentially-performed pre-stage and light emission stage, and the duration of the light emission stage is just the light emission duration of the light-emitting element in the second working stage.

In some embodiments, the pre-stage Ta further includes a data writing stage Tg. As shown in FIG. 12, the bias stage includes only the first bias sub-stage Tc, and the data writing stage Tg is between the first bias sub-stage Tc and the light emission stage Tb; or, as shown in FIG. 13, the bias stage includes only the second bias sub-stage Td, and the second bias sub-stage Td is between the data writing stage Tg and the light emission stage Tb; or, as shown in FIG. 14, the bias stage includes the first bias sub-stage Tc and the second bias sub-stage Td, and the data writing stage Tg is between the first bias sub-stage Tc and the second bias sub-stage Td.

In this embodiment, the bias module 23 includes a bias transistor M3, and the bias transistor M3 is P-type, but is not limited thereto. A gate of the bias transistor M3 is connected to the bias control terminal SPI, and the bias transistor M3 is connected between the bias signal terminal DVI and the first terminal N1 of the drive transistor M0. When the bias transistor M3 is a P-type, the bias control terminal SPI is configured to provide a low voltage as an effective pulse signal, to turn on the bias transistor M3. The bias control terminal SPI is configured to provide a high voltage as an ineffective pulse signal to turn off the bias transistor M3. In some embodiments, the first dimming transistor M1 and the second dimming transistor M2 are both P-type.

The working stages of the pixel circuit include contents as follows.

In the pre-stage Ta, EM is configured to provide a high voltage to turn off M1 and M2; and in the light emission stage Tb, EM is configured to provide a low voltage to turn on both M1 and M2.

In the first bias sub-stage Tc, SPI is configured to provide a low voltage to turn on the M3, the drive transistor M0 maintains the on state, and then, the high voltage provided by the bias signal terminal DVI is written into the source and drain of the drive transistor M0.

In a reset stage (Te+Tf), the reset control terminal S1N1 is configured to provide a high voltage to turn on the reset transistor M4, and the low voltage provided by the VREF is written to the control terminal of the drive transistor M0 to control the drive transistor M0 to be turned on.

In a compensation stage (Tf+Tg+Th), the compensation control terminal S2N1 is configured to provide a high voltage to turn on the compensation transistor M5. In some embodiments, in the Tf stage, the reset transistor M4 is maintained in the on state, thus, the low voltage provided by the VREF is written into the gate, drain and source of the drive transistor M0, and the drive transistor M0 is maintained in the on state; in the Tg stage, the reset transistor M4 is turned off, the drive transistor M0 is maintained in the on state, the data writing transistor M6 is turned on, and a data signal provided by the data signal terminal DATA is written into the source, the drain and the gate of the drive transistor M0; and in the Th stage, the drive transistor M0 is maintained in the on state, the source, the drain and the gate of the drive transistor M0 are stabilized to be the data signal. The Tg stage is just the data writing stage.

In the second bias sub-stage Td, the bias control terminal SPI is configured to provide a low voltage to turn on the M3, the drive transistor M0 is maintained in the on state, and a high voltage provided by the bias signal terminal DVI is written again to the source of the drive transistor M0 and the drain of the drive transistor M0.

Figure 15:
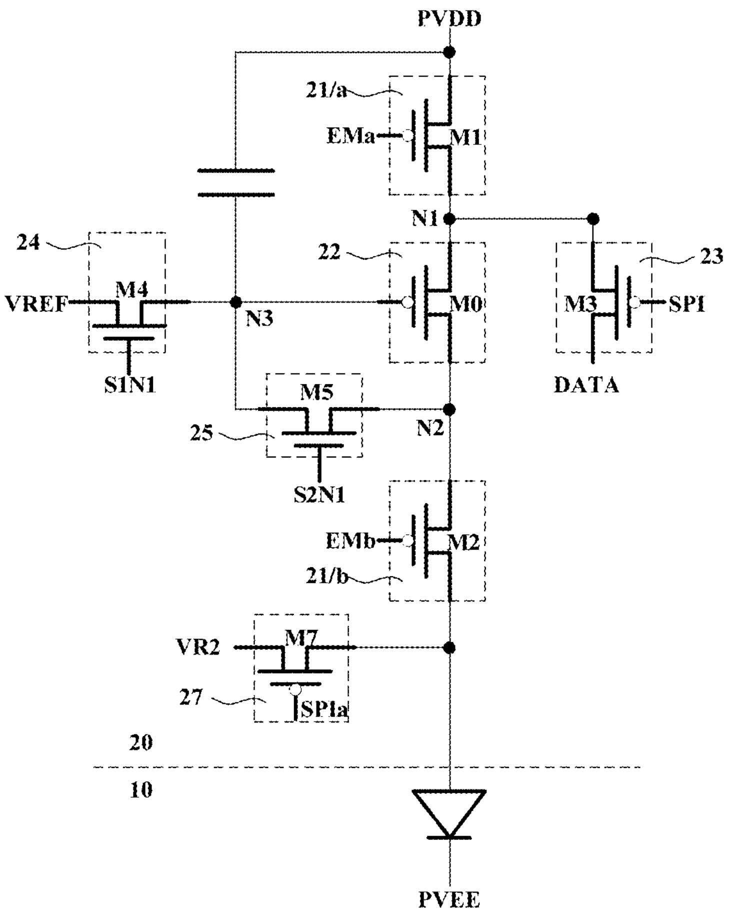
FIG. 15 is another schematic diagram of a pixel circuit according to an embodiment of the present invention.
Figure 16:
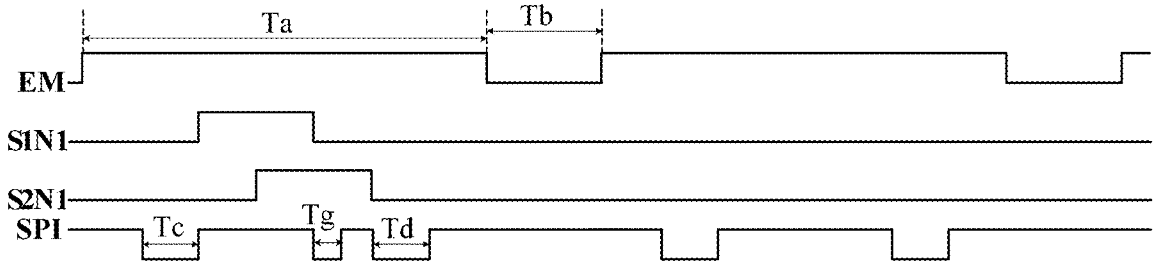
FIG. 16 is a schematic timing diagram of the pixel circuit shown in FIG. 15.

In other embodiments, the pixel circuit may further be of other structures, for example, FIG. 15 is another schematic diagram of a pixel circuit according to an embodiment of the present invention. FIG. 16 is a schematic timing diagram of the pixel circuit shown in FIG. 15. As shown in FIG. 15 and FIG. 16, in some embodiments, the bias module 23 is also served as the data writing module, the data signal terminal DATA is also served as the bias signal terminal DVI. The bias module 23 is further turned on in the data writing stage Tg. In the data writing stage, the data signal terminal DATA is configured to provide a data signal; and in the bias stage, the data signal terminal DATA is configured to provide a bias signal voltage.

As shown in FIG. 16, in some embodiments, the bias stage includes the first bias sub-stage Tc and the second bias sub-stage Td, and the data writing stage Tg is between the first bias sub-stage Tc and the second bias sub-stage Td. In other embodiments, the bias stage includes only the first bias sub-stage or the bias stage includes only the second bias sub-stage.

As shown in FIG. 16, in the first bias sub-stage Tc, the bias control terminal SPI provides a low voltage to turn on the M3, the drive transistor M0 is maintained in the on state, and the data signal terminal DATA provides a high voltage and the high voltage is written into the source of the drive transistor M0 and the drain of the drive transistor M0. In the data writing stage Tg, the reset transistor M4 is turned off, the drive transistor M0 is maintained in the on state, the bias control terminal SPI provides a low voltage to turn on the M3, the data signal terminal DATA provides a data signal and the data signal is written into the source, drain and gate of the drive transistor M0. In the second bias sub-stage Td, the bias control terminal SPI provides a low voltage to turn on the M3, the drive transistor M0 is maintained in the on state, then the data signal terminal DATA provides a high voltage and again the high voltage is written into the source and drain of the drive transistor M0.

In some embodiments, the display panel includes S refresh image frames, one of the S refresh image frames includes M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1. Within one of the S refresh image frames, in the pre-stage of the data writing frame, the bias signal terminal is configured to provide a fixed voltage, and in the pre-stage of the retention frame, the bias signal terminal is configured to provide a fixed voltage.

In this embodiment, the pixel circuit 20 includes a data writing module 26 and a bias module 23. Within one of the S refresh image frames, display data is normally written during the data writing frame and is not written during the retention frame, so the data signal terminal DATA is configured to provide a data signal in the data writing stage Tg of the data writing frame. The bias signal terminal DVI is configured to provide a fixed voltage signal in the working stage. Illustratively, the bias signal terminal DVI is configured to provide a fixed voltage signal dva in the first working stage, the bias signal terminal DVI is configured to provide a fixed voltage signal dvb in the second working stage, and dva is different from dvb.

In some embodiments, the display panel includes S refresh image frames, one of the S refresh image frames includes M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1. Within one of the S refresh image frames, in the pre-stage of the data writing frame, the bias signal terminal DVI is configured to provide a data signal, and in the pre-stage of the retention frame, the bias signal terminal DVI is configured to provide a fixed voltage.

In this embodiment, the pixel circuit 20 includes a bias module 23, the bias module 23 is also served as a data writing module 26. In other words, in this embodiment, the data writing module 26 and the bias module 23 are the same module, a data writing signal terminal and the bias signal terminal are the same signal terminal, and a data line for transmitting a data signal and a signal line for transmitting a bias signal are the same signal line. Within one of the S refresh image frames, display data is normally written during the data writing frame and is not written during the retention frame. Based on this, the bias signal terminal DVI is configured to provide a data signal in the data writing stage Tg of the data writing frame, and the bias signal terminal DVI is configured to provide a fixed voltage signal in the bias stage.

Figure 17:
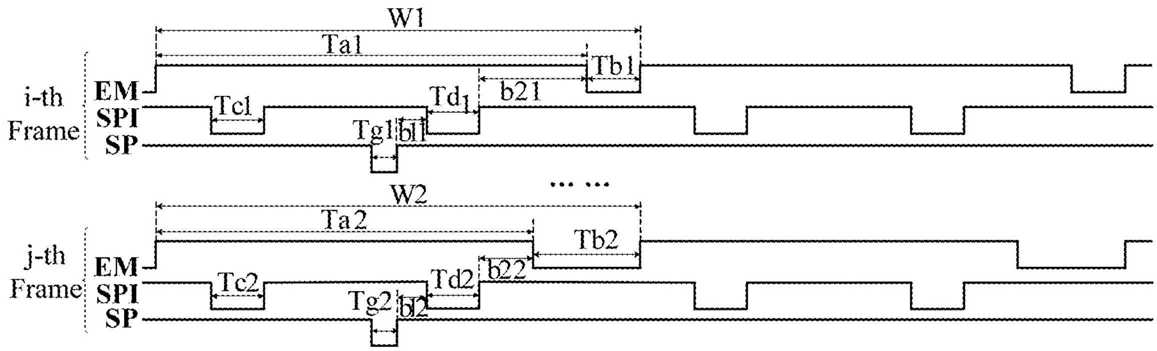
FIG. 17 is yet another schematic timing diagram of a pixel circuit according to an embodiment of the present invention.

FIG. 17 is yet another schematic timing diagram of a pixel circuit according to an embodiment of the present invention. As shown in FIG. 17, in some embodiments, $b_1$ is a time interval between the data writing stage Tg and the second bias sub-stage Td sequentially performed in the working stage, and $b_2$ is a time interval between the second bias sub-stage Td and the light emission stage Tb sequentially performed in the working stage; $b_{11}=b_{12}$, and $b_{21}\neq b_{22}$; $b_{11}$ is $b_1$ in the first working stage W1, $b_{12}$ is $b_1$ in the second working stage W2, $b_{21}$ is $b_2$ in the first working stage W1, and $b_{22}$ is $b_2$ in the second working stage W2. The bias signal voltage corresponding to the first working stage W1 is not equal to the bias signal voltage corresponding to the second working stage W2. In some embodiments, the first working stage W1 and second working stage W2 are data writing frames of different refresh image frames, but are not limited thereto. In other embodiments, the first working stage and the second working stage may further be the x-th retention frames of different refresh image frames, or the first working stage and the second working stage may further be retention frames in the same refresh image frame, or the first working stage and the second working stage are the data writing frame and the retention frame in the same refresh image frame.

In this embodiment, $b_{11}$ is a time interval between a data writing stage Tg1 and a second bias sub-stage Td1 sequentially performed in the first working stage W1, and $b_{12}$ is a time interval between a data writing stage Tg2 and a second bias sub-stage Td2 sequentially performed in the second working stage W2. $b_{11}$ may be equal to $b_{12}$. $b_{21}$ is a time interval between the second bias sub-stage Td1 and a light emission stage Tb1 sequentially performed in the first working stage W1, and $b_{22}$ is a time interval between the second bias sub-stage Td2 and a light emission stage Tb2 sequentially performed in the second working stage W2. In the case where $b_{11}$ is equal to $b_{12}$, it is possible to adjust the time interval $b_2$ between the second bias sub-stage and the light emission stage to allow the duration of the light emission stage Tb1 in the first working stage W1 to be not equal to the duration of the light emission stage Tb2 in the second working stage W2. Correspondingly, the bias signal voltage corresponding to the first working stage W1 is not equal to the bias signal voltage corresponding to the second working stage W2.

In some embodiments, Tb1 is shorter than Tb2, and in the case where $b_{11}$ is equal to $b_{12}$, $b_{21}$ is larger than $b_{22}$, thus, Tb1 can be shorter than Tb2, and accordingly, the bias signal voltage corresponding to the first working stage W1 is lower than the bias signal voltage corresponding to the second working stage W2.

Figure 18:
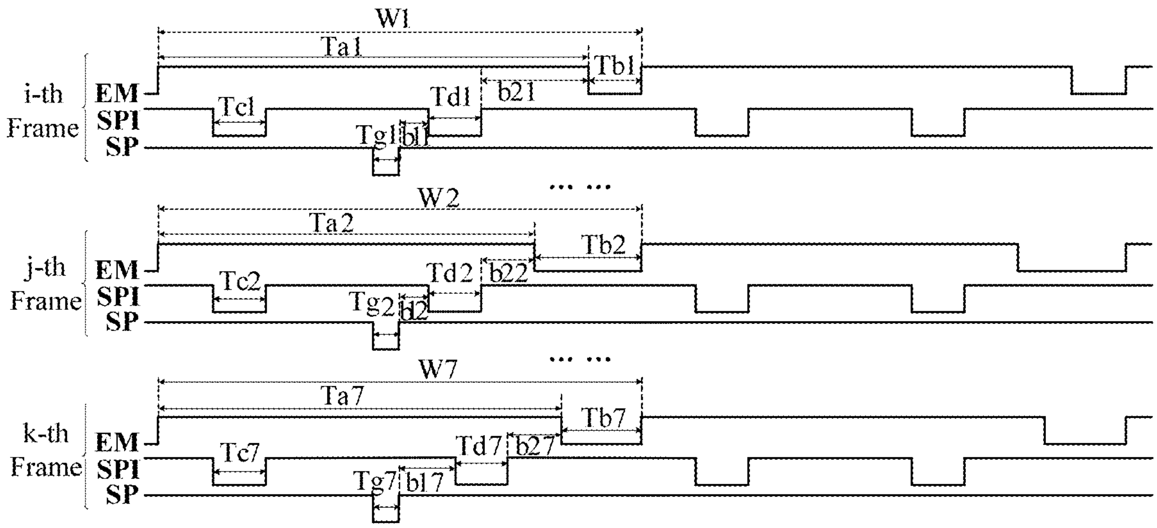
FIG. 18 is yet another schematic timing diagram of a pixel circuit according to an embodiment of the present invention.

FIG. 18 is yet another schematic timing diagram of a pixel circuit according to an embodiment of the present invention. As shown in FIG. 18, in some embodiments, the multiple working stages further include a seventh working stage W7, a light emission duration Tb7 of the light-emitting element in the seventh working stage W7 is different from the light emission duration in the first working stage W1 and is different from the light emission duration in the second working stage W2, where $b_{12}\neq b_{17}$, and $b_{22}=b_{27}$, in which $b_{17}$ is $b_1$ in the seventh working stage W7, and $b_{27}$ is $b_2$ in the seventh working stage W7. A bias signal voltage corresponding to the seventh working stage W7 is equal to the bias signal voltage corresponding to the second working stage W2. In some embodiments, the first working stage W1, the second working stage W2 and the seventh working stage W7 are data writing frames of different refresh image frames, but are not limited thereto. In other embodiments, the first working stage W1, the second working stage W2 and the seventh working stage W7 are the x-th retention frames of different refresh image frames, or, the first working stage W1, the second working stage W2 and the seventh working stage W7 are retention frames of the same refresh image frame, or, the first working stage W1, the second working stage W2 and the seventh working stage W7 are respectively the data writing frame and two retention frames in the same refresh image frame. In some embodiments, a pre-stage of the seventh working stage W7 is Ta7.

In this embodiment, $b_{17}$ is a time interval between a data writing stage Tg7 and a second bias sub-stage Td7 sequentially performed in the seventh working stage W7, $b_{17}$ is not equal to $b_{12}$, and $b_{11}=b_{12}$. $b_{27}$ is a time interval between the second bias sub-stage Td7 and a light emission stage Tb7 sequentially performed in the seventh working stage W7, $b_{21}$ is not equal to $b_{22}$, and $b_{22}=b_{27}$. In the case where $b_{22}$ is equal to $b_{27}$, the same bias signal voltage can be provided to the seventh working stage W7 and the second working stage W2, and thus, power consumption can be reduced.

As described above, when the first working stage W1 is taken as a normal working stage, and the second working stage W2 and the seventh working stage W7 are two working stages after dimming on the basis of the first working stage W1, the first working stage W1 may be taken as a comparison object. The light emission durations of the light-emitting element in the first working stage W1, the second working stage W2 and the seventh working stage W7 are different. In some embodiments, $b_{11}=b_{12}$, $b_{21}$ is not equal to $b_{22}$; $b_{27}$ is equal to $b_{22}$, and $b_{21}$ is not equal to $b_{27}$.

The bias signal voltage of the bias signal terminal DVI corresponding to the seventh working stage W7 is equal to the bias signal voltage corresponding to the second working stage W2, and the bias signal voltage of the bias signal terminal DVI corresponding to the first working stage W1 is not equal to the bias signal voltage corresponding to the second working stage W2. Based on this, the pixel circuit can adjust different light emission durations such as 4H, 8H and 12H, and adjust the bias signal voltage accordingly, and the adjusted bias signal voltage is different from the bias signal voltage in the first working stage W1. In addition, it is also possible to ensure that the bias signal voltage is a constant value by changing the timing of the bias adjustment stages, in this way, the driver chip does not need to be set too many groups of voltages in advance, thereby facilitating the saving of IC resources.

In some embodiments, compared with the first working stage W1, the seventh working stage W7 and the second working stage W2 are both in an EM backward dimming mode. Although the light emission durations in the seventh working stage W7 and the second working stage W2 are different, the bias adjustment duration $b_{27}$ in the seventh working stage W7 is equal to the bias adjustment duration $b_{22}$ in the second working stage W2. Therefore, in the same EM backward dimming mode, and with the same bias adjustment durations in the seventh working stage W7 and the second working stage W2, the threshold voltage offset degree in the seventh working stage W7 and the threshold voltage offset degree in the second working stage W2 are enabled to be almost equal. Based on this, the bias signal voltage of the bias signal terminal DVI corresponding to the seventh working stage W7 can be set equal to the bias signal voltage of the bias signal terminal DVI corresponding to the second working stage W2, so that the seventh working stage W7 and the second working stage W2 can each have an optimal bias adjustment effect.

A display device is provided according to an embodiment of the present invention, which includes the display panel according to any of the embodiments described above. With the display panel, when in EM dimming, in a case where the duration of the non-light emission stage is increased, the voltage signal provided by the bias signal terminal DVI is correspondingly decreased; and in a case where the duration of the non-light emission stage is decreased, the voltage signal provided by the bias signal terminal DVI is increased accordingly, thereby the display uniformity of the display panel can be improved and the screen blinking can be reduced.

Figure 19:
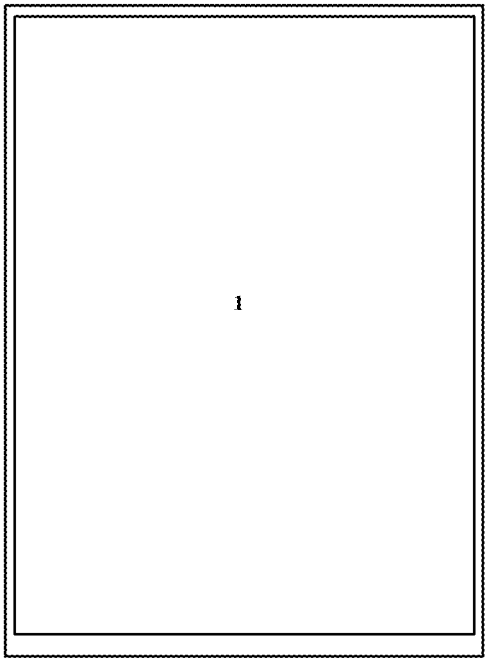
FIG. 19 is a schematic diagram of a display device according to an embodiment of the present invention.

In some embodiments, the display panel is an organic light emission display panel or a micro LED display panel, and is not limited thereto. FIG. 19 is a schematic diagram of a display device according to an embodiment of the present invention. As shown in FIG. 19, in some embodiments, the display device is applied to an electronic device 1 such as a smartphone, a tablet computer, or the like. It may be appreciated that the above-described embodiments provide only part of the structures of the display panel and the pixel circuit, and the display panel further includes other structures, which are not described in detail herein.

What is claimed is:

1. A display panel, comprising:

a pixel circuit and a light-emitting element;

wherein the pixel circuit comprises a dimming module, a drive module, and a bias module, and the dimming module and the drive module are both connected to the light-emitting element;

wherein a control terminal of the dimming module is connected to a dimming control terminal, and the dimming module is configured to adjust a light emission duration of the light-emitting element;

wherein the drive module is configured to provide a drive current for the light-emitting element, and the drive module comprises a drive transistor;

wherein the bias module is connected between a bias signal terminal and a first terminal of the drive transistor, a control terminal of the bias module is connected to the bias control terminal, the bias module is configured to perform bias adjustment on the drive transistor, and the bias signal terminal is configured to provide a bias signal; and wherein the pixel circuit comprises a plurality of working stages, the plurality of working stages comprises at least a first working stage and a second working stage, a light emission duration of the light-emitting element in the first working stage and a light emission duration of the light-emitting element in the second working stage are different, and a bias signal voltage provided by the bias signal terminal in the first working stage and a bias signal voltage provided by the bias signal terminal in the second working stage are different.

2. The display panel according to claim 1, wherein the display panel comprises S refresh image frames, one of the S refresh image frames comprises M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1; and wherein the first working stage is an x-th refresh image subframe of an i-th refresh image frame of the S refresh image frames, and the second working stage is an x-th refresh image subframe of a j-th refresh image frame of the S refresh image frames, wherein i≠j, and M≥x≥1.

3. The display panel according to claim 1, wherein the light emission duration of the light-emitting element in the first working stage is shorter than the light emission duration of the light-emitting element in the second working stage, and the bias signal voltage corresponding to the first working stage is lower than the bias signal voltage corresponding to the second working stage.

4. The display panel according to claim 1, wherein the display panel comprises S refresh image frames, one of the S refresh image frames comprises M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, wherein S>1, M>1;

wherein the first working stage is a data writing frame of an i-th refresh image frame, and the second working stage is a data writing frame of a j-th refresh image frame, wherein i≠j;

wherein the plurality of working stages further comprises a third working stage and a fourth working stage, the third working stage is a p-th refresh image subframe of the i-th refresh image frame, and the fourth working stage is a p-th refresh image subframe of the j-th refresh image frame, wherein 2≤p≤M; and wherein a light emission duration of the light-emitting element in the third working stage is different from a light emission duration of the light-emitting element in the fourth working stage, and a bias signal voltage corresponding to the third working stage is different from a bias signal voltage corresponding to the fourth working stage.

5. The display panel according to claim 4, wherein the light emission duration of the light-emitting element in the first working stage is shorter than the light emission duration of the light-emitting element in the second working stage, and the bias signal voltage corresponding to the first working stage is lower than the bias signal voltage corresponding to the second working stage; and wherein the light emission duration of the light-emitting element in the third working stage is shorter than the light emission duration of the light-emitting element in the fourth working stage, and the bias signal voltage corresponding to the third working stage is lower than the bias signal voltage corresponding to the fourth working stage.

6. The display panel according to claim 1, wherein the display panel comprises S refresh image frames, one of the S refresh image frames comprises M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1; and wherein the first working stage is an x-th refresh image subframe of an i-th refresh image frame, and the second working stage is a y-th refresh image subframe of the i-th refresh image frame, wherein M≥x≥1, M≥y≥1, and x≠y.

7. The display panel according to claim 6, wherein the plurality of working stages further comprises a fifth working stage and a sixth working stage, the fifth working stage is an x-th refresh image subframe of a j-th refresh image frame, and the sixth working stage is a y-th refresh image subframe of the j-th refresh image frame;

wherein a light emission duration of the light-emitting element in the fifth working stage is different from the light emission duration of the light-emitting element in the first working stage, and a light emission duration of the light-emitting element in the sixth working stage is different from the light emission duration of the light-emitting element in the second working stage; and wherein $\Delta Ti_{15} \neq \Delta Ti_{26}$, $\Delta V_{15} \neq \Delta V_{26}$, $\Delta Ti_{15}$ is a difference between a light emission duration of the light-emitting element in the first working stage and a light emission duration of the light-emitting element in the fifth working stage, $\Delta Ti_{26}$ is a difference between the light emission duration of the light-emitting element in the second working stage and the light emission duration of the light-emitting element in the sixth working stage, $\Delta V_{15}$ is a difference between a bias signal voltage corresponding to the first working stage and a bias signal voltage corresponding to the fifth working stage, and $\Delta V_{26}$ is a difference between a bias signal voltage corresponding to the second working stage and a bias signal voltage corresponding to the sixth working stage.

8. The display panel according to claim 1, wherein the display panel comprises N light emission duration intervals which are different from each other and N bias signal voltages which are different from each other, and a k-th light emission duration interval corresponds to a k-th bias signal voltage, N≥k≥1, N>1; and wherein a light emission duration of the light-emitting element in one of the plurality of working stages is within the k-th light emission duration interval, and a bias signal provided by the bias signal terminal in the one of the plurality of working stages is the k-th bias signal voltage.

9. The display panel according to claim 8, wherein a light emission duration value of the k-th light emission duration interval is smaller than a light emission duration value of a (k+1)-th light emission duration interval, and the k-th bias signal voltage is lower than or equal to a (k+1)-th bias signal voltage.

10. The display panel according to claim 1, wherein the plurality of working stages of the pixel circuit comprise a pre-stage and a light emission stage which are sequentially performed, and the dimming module is turned off in the pre-stage and turned on in the light emission stage; and wherein the pre-stage comprises a bias stage, the bias module is turned on in the bias stage, and the bias stage comprises at least one of a first bias sub-stage or a second bias sub-stage.

11. The display panel according to claim 10, wherein the pre-stage further comprises a data writing stage; and wherein the bias stage comprises only the first bias sub-stage, and the data writing stage is between the first bias sub-stage and the light emission stage; or, the bias stage comprises only the second bias sub-stage, and the second bias sub-stage is between the data writing stage and the light emission stage; or, the bias stage comprises the first bias sub-stage and the second bias sub-stage, and the data writing stage is between the first bias sub-stage and the second bias sub-stage.

12. The display panel according to claim 11, wherein the bias module is also served as a data writing module, and the bias module is also turned on in the data writing stage.

13. The display panel according to claim 12, wherein the display panel comprises S refresh image frames, one of the S refresh image frames comprises M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1; and wherein within one of the S refresh image frames, in the pre-stage of the data writing frame, the bias signal terminal is configured to provide a data signal, and in the pre-stage of the retention frame, the bias signal terminal is configured to provide a fixed voltage.

14. The display panel according to claim 11, wherein the pixel circuit further comprises a data writing module; and wherein the data writing module is connected between a data signal terminal and the first terminal of the drive transistor, a control terminal of the data writing module is connected to a writing control terminal, and the data writing module is turned on in the data writing stage.

15. The display panel according to claim 14, wherein the display panel comprises S refresh image frames, one of the S refresh image frames comprises M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1; and wherein within one of the S refresh image frames, in the pre-stage of the data writing frame, the bias signal terminal is configured to provide a fixed voltage, and in the pre-stage of the retention frame, the bias signal terminal is configured to provide a fixed voltage.

16. The display panel according to claim 11, wherein $b_1$ is a time interval between the data writing stage and the second bias sub-stage sequentially performed in the working stage, and $b_2$ is a time interval between the second bias sub-stage and the light emission stage sequentially performed in the working stage; and wherein $b_{11}=b_{12}$, and $b_{21}\neq b_{22}$;

$b_{11}$ is $b_1$ in the first working stage, $b_{12}$ is $b_1$ in the second working stage, $b_{21}$ is $b_2$ in the first working stage, and $b_{22}$ is $b_2$ in the second working stage; and the bias signal voltage corresponding to the first working stage is not equal to the bias signal voltage corresponding to the second working stage.

17. The display panel according to claim 16, wherein the plurality of working stages further comprises a seventh working stage, a light emission duration of the light-emitting element in the seventh working stage is different from the light emission duration of the light-emitting element in the first working stage and is different from the light emission duration of the light-emitting element in the second working stage; and wherein $b_{12}\neq b_{17}$, and $b_{22}=b_{27}$;

$b_{17}$ is $b_1$ in the seventh working stage, and $b_{27}$ is $b_2$ in the seventh working stage; and a bias signal voltage corresponding to the seventh working stage is equal to the bias signal voltage corresponding to the second working stage.

18. A display device, comprising a display panel, wherein the display panel comprises:

a pixel circuit and a light-emitting element;

wherein the pixel circuit comprises a dimming module, a drive module, and a bias module, and the dimming module and the drive module are both connected to the light-emitting element;

wherein a control terminal of the dimming module is connected to a dimming control terminal, and the dimming module is configured to adjust a light emission duration of the light-emitting element;

wherein the drive module is configured to provide a drive current for the light-emitting element, and the drive module comprises a drive transistor;

wherein the bias module is connected between a bias signal terminal and a first terminal of the drive transistor, a control terminal of the bias module is connected to the bias control terminal, the bias module is configured to perform bias adjustment on the drive transistor, and the bias signal terminal is configured to provide a bias signal; and wherein the pixel circuit comprises a plurality of working stages, the plurality of working stages comprises at least a first working stage and a second working stage, a light emission duration of the light-emitting element in the first working stage and a light emission duration of the light-emitting element in the second working stage are different, and a bias signal voltage provided by the bias signal terminal in the first working stage and a bias signal voltage provided by the bias signal terminal in the second working stage are different.

19. The display device according to claim 18, wherein the display panel comprises S refresh image frames, one of the S refresh image frames comprises M refresh image subframes, a first refresh image subframe of the M refresh image subframes in the one of the S refresh image frames is a data writing frame, and a second refresh image subframe to an M-th refresh image subframe of the M refresh image subframes in the one of the S refresh image frames are each a retention frame, S>1, M>1; and wherein the first working stage is an x-th refresh image subframe of an i-th refresh image frame of the S refresh image frames, and the second working stage is an x-th refresh image subframe of a j-th refresh image frame of the S refresh image frames, wherein $i\neq j$, and $M\geq x\geq 1$.

20. The display device according to claim 18, wherein the light emission duration of the light-emitting element in the first working stage is shorter than the light emission duration of the light-emitting element in the second working stage, and the bias signal voltage corresponding to the first working stage is lower than the bias signal voltage corresponding to the second working stage.

* * * * *